Jan. 30, 1951   C. R. SUSKA   2,539,598
TEMPERATURE CONTROLLED MIXING VALVE
Filed Nov. 4, 1948   9 Sheets-Sheet 6

Inventor
C. R. Suska
By Kimmel & Crowell
Attys.

Patented Jan. 30, 1951

2,539,598

UNITED STATES PATENT OFFICE 2,539,598

TEMPERATURE CONTROLLED MIXING VALVE

Charles R. Suska, Corry, Pa., assignor to Aero Supply Mfg. Co. Inc., Corry, Pa.

Application November 4, 1948, Serial No. 58,198

24 Claims. (Cl. 236—12)

This invention relates to temperature controlled mixing valves.

An object of this invention is to provide a mixing valve wherein at least two fluids of different temperatures are adapted to be mixed together with the temperature of the mixed fluids controlled by means of thermostatic switches connected to the valve plug operator.

Another object of this invention is to provide a mixing valve including at least one quick acting thermostatic switch which is connected to a solenoid valve operator so that the temperature of the mixed fluids will be held to a predetermined minimum and maximum.

Another object of this invention is to provide in combination with a multi-pole time switch, a mixing valve, an electric operator for the valve, thermostatic switches connected to the time switch and the electric operator whereby a predetermined temperature of fluid passing through the valve will be maintained for a selected time period, and a float operated switch adapted to cut off current to the time switch and the thermostatic switches when a predetermined quantity of mixed fluids has been discharged into a receiver, such as a washing machine or the like.

A further object of this invention is to provide a modulated valve operation in a mixing valve so that tempered fluid may be discharged from the valve, the physical movement of the valve plug being effected by means of a solenoid connected to a series of thermostatic switches which are highly sensitive to temperature fluctuations.

A further object of this invention is to provide in a mixing valve, an electrically operated valve plug, the plug having associated therewith a pilot valve which upon being moved to open position will provide substantially equalized pressures on opposite sides of the main valve plug in order that the movement of the main valve plug to open or mixing position may be effected by a relatively small operator.

A further object of this invention is to provide in a mixing valve of this kind an electric operator which is so connected with the valve plug as to provide an initial lost motion and a subsequent hammer force on the valve plug in order that the electric operator will not be subjected to an initial full load. Where a pilot valve is used with the main valve plug, the pilot valve is also subjected to a hammer force, and there is a further lost motion between the pilot valve and the main valve with the latter being subjected to a final hammer force.

With the above and other objects in view, my invention consists in the arrangement, combination and details of construction disclosed in the drawings and specifications, and then more particularly pointed out in the appended claims.

Referring to the drawings and first to Figures 1 to 12 inclusive, the numeral 25 designates generally a valve housing which is formed with a pair of fluid intake nipples 26 and 27 through which hot or cold fluids respectively are adapted to pass. The housing 25 includes a chamber 28 within which the hot fluid initially engages, and a strainer or screen 29, of cylindrical configuration, is disposed in the chamber 28.

Figure 4:
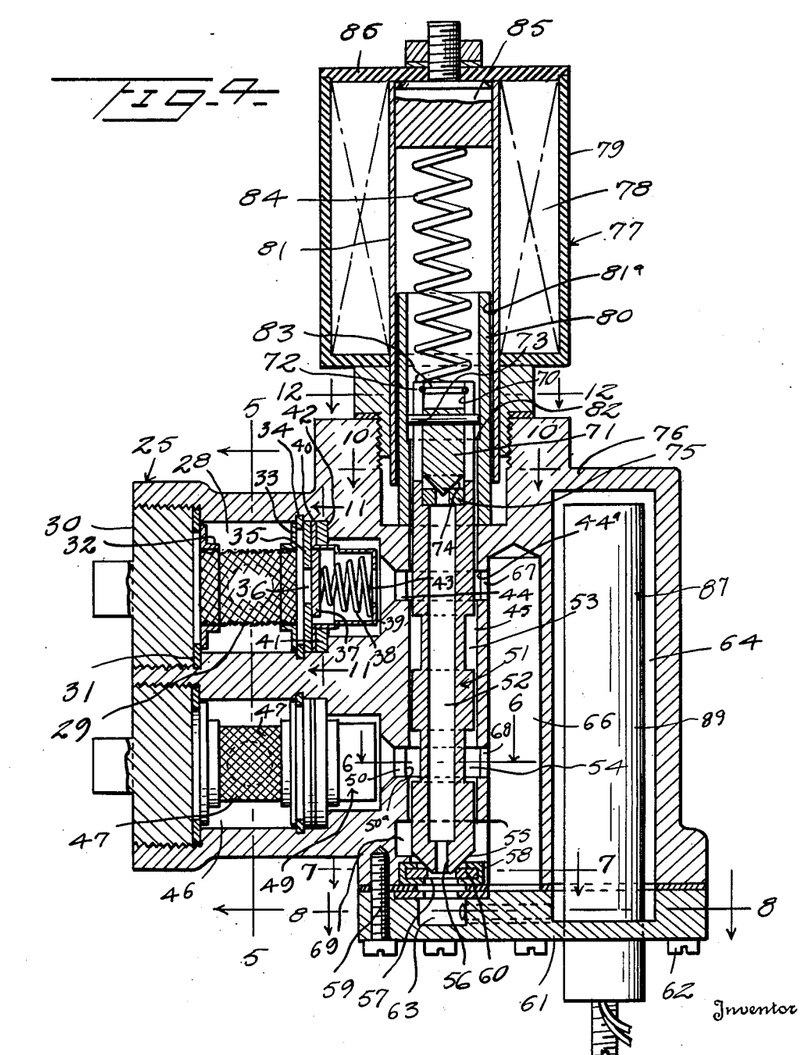
Figure 4 is a sectional view taken substantially on the line 4—4 of Figure 1.
Figure 5:
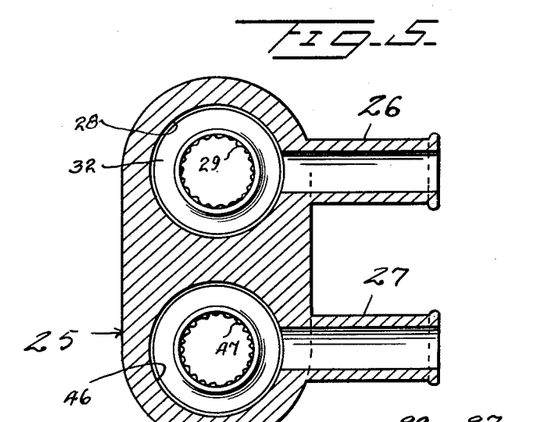
Figure 5 is a sectional view taken substantially on the line 5—5 of Figure 4.
Figure 6:
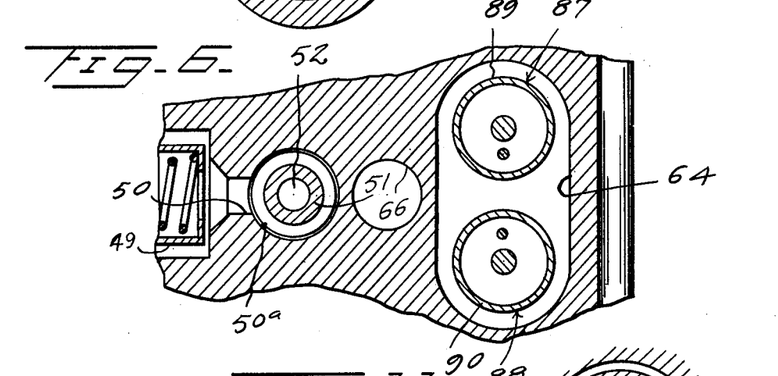
Figure 6 is a fragmentary sectional view taken on the line 6—6 of Figure 4.

A plug 30 is threaded into the housing 25 and bears against a gasket 31 with a flanged annulus 32 bearing against the gasket 31. The flanged annulus 32 engages about the outer end of the screen or strainer 29, and a similar flanged annulus 33 is secured to the inner end of the screen 29. The inner flanged annulus 33 bears against a split seat forming ring 34 which is disposed at substantially the inner portion of the chamber 28.

A plate 35 which is formed with a central opening 36 is disposed at the inner end of the chamber 28, bearing against the inner side of the ring 34. The plate 35 forms a valve seat against which a triangular valve member 37 is adapted to engage, being normally held against the seat forming member 35 by means of a spring 38.

A cage 39 engages about the spring 38 and is formed with an annular flange 40, bearing against a gasket ring 41 which seats on a shoulder 42 formed at the inner end of the chamber 28. The cage 39 is formed with a central opening or port 43 communicating with a fluid intake port 44. The port 44 communicates with a vertical plug guiding bore 45 which is formed in the housing 25. The housing 25 is formed with an annular groove 44a communicating with port 44 so as to equalize the pressure entirely around the valve plug.

The cold fluid intake nipple 27 communicates with a chamber 46 within which a screen or strainer 47 is disposed, and the chamber 46 has disposed at the inner portion thereof a check valve structure generally designated as 49, which is similar to the check valve structure hereinbefore described, which includes the plates 35, the valve 37, spring 38, and cage 39.

The housing 25 is also formed with a cold water intake port 50, communicating with the bore 45 at a point below the hot water or fluid intake port 44. A vertical movable valve plug generally designated as 51 is slidable in the bore 45, and in the present instance the valve plug 51, which is formed with a central bore 52, is provided with a pair of spaced peripheral grooves 53 and 54 which are correlated with the ports 44 and 50 respectively. The housing 25 is formed with a second annular groove 50a communicating with port 50 to equalize the pressure around plug 51. Through the use of the pressure equalizing grooves 44a and 50a the clearance between plug 51 and bore 45 may be reduced to a minimum.

The plug 51 is formed at its lower end with a substantially conical head 55 and is also formed with a reduced diameter counterbore 56 which is substantially smaller than the central port or passage 57 through a valve seat structure 58. The valve seat structure 58 includes a cage or holder 59 within which a gasket or seat forming member 60 is positioned.

The housing 25 includes a removable plate or head 61, secured to the lower portion of the housing 25 by fastening members 62. The head 61 is formed with a recess 63 which is adapted to communicate with a regulating chamber 64 by means of one or more passages 65. The control or regulating chamber 64 is disposed in offset relation with respect to the bore 45, and a mixing chamber 66 is disposed between the bore 45 and the regulating chamber 64.

The mixing chamber 66 communicates with the bore 45 through ports 67 and 68 which are positioned in alignment with the ports 44 and 50 respectively. An outlet chamber 69 is disposed at the lower end of the bore 45 and communicates with the mixing chamber 66 and is disposed substantially above the valve structure 58.

The valve plug 51 includes a counterbore 70 adjacent the upper end thereof, within which a pilot valve 71 is slidably mounted. The valve plug 51 is formed with a pair of upwardly extending slots 72 within which a pilot guiding pin 73 is slidably mounted. The pin 73 extends through the pilot valve 71, adjacent the upper end thereof and is held against endwise movement as will be hereinafter described. The pilot valve 71 is formed with a conical lower end 74 which is adapted to engage on a seat forming gasket 75 which is carried by the valve plug 51 at the lower end of the counterbore 70.

The housing 25 has mounted on the upper wall 76 thereof an electric valve plug operator generally designated as 77. The operator 77 includes a solenoid coil 78 mounted in the casing or housing 79, and also includes a hollow core 80 which is slidable in a tubular guide or sleeve 81 disposed within the coil 78. The core 80 engages loosely about the upper end of the valve plug 51 and is formed with a shoulder 82 against which the outer ends of the pin 73 are adapted to engage so that upon upward movement of the core 80 the pilot valve 71 will initially be moved to open position. After the pilot valve 71 is moved to completely open position, further upward movement of the valve 71 will be stopped by engagement of this valve with a split ring 83 which is disposed within the upper end portion of the counterbore 70. After the pilot valve 71 engages the locking ring 83, further upward movement of core 80 will effect movement of valve plug 51 therewith. Pressure is communicated from mixing chamber 66 to the interior of guide 81 by means of the space 81a between core 80 and guide 81. The space or passage 81a provides a dashpot action when core 80 moves in either direction so as to cushion the movement of core 80 in either direction.

A counter-balancing spring 84 is disposed within the tubular member or guide 81 and bears at its lower end against the upper end of the valve plug 51 and bears at its upper end against a plug 85 which is secured within the upper end of the jacket or housing 79 and is extended through a top wall 86.

The regulating chamber 64 has disposed therein a pair of thermostatic switch members generally designated as 87 and 88. These thermostatic switches 87 and 88 are of conventional construction and are of the enclosed type, being enclosed in jackets or casings 89 and 90 respectively so that these switches may be immersed in the fluid passing through the chamber 64. The chamber 64 has extending therefrom an outlet nipple 91 which is adapted to be connected to a receiver such as a washing machine or the like.

Figures 1, 2, 12:
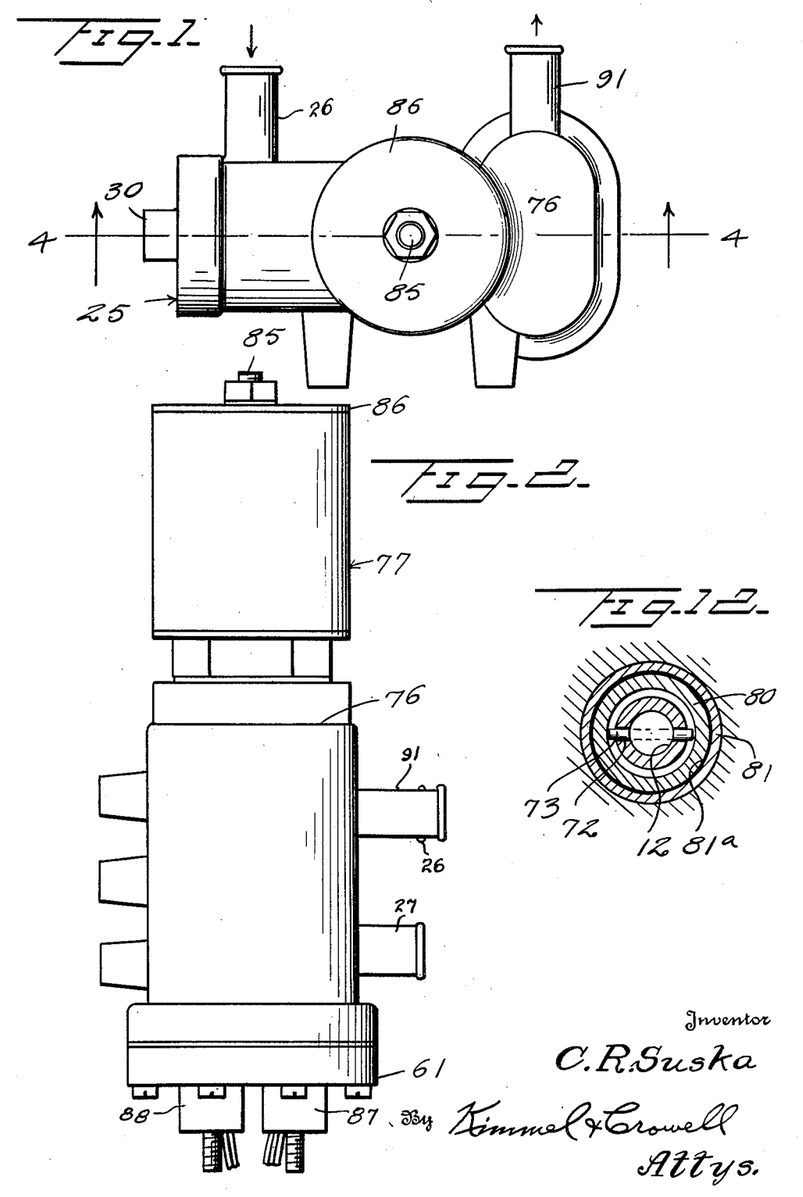
Figure 1 is a plan view of a temperature control mixing valve constructed according to an embodiment of this invention.
Figure 2 is a detail end elevation of the device.
Figure 12 is a fragmentary sectional view taken on the line 12—12 of Figure 4.
Figures 3, 9:
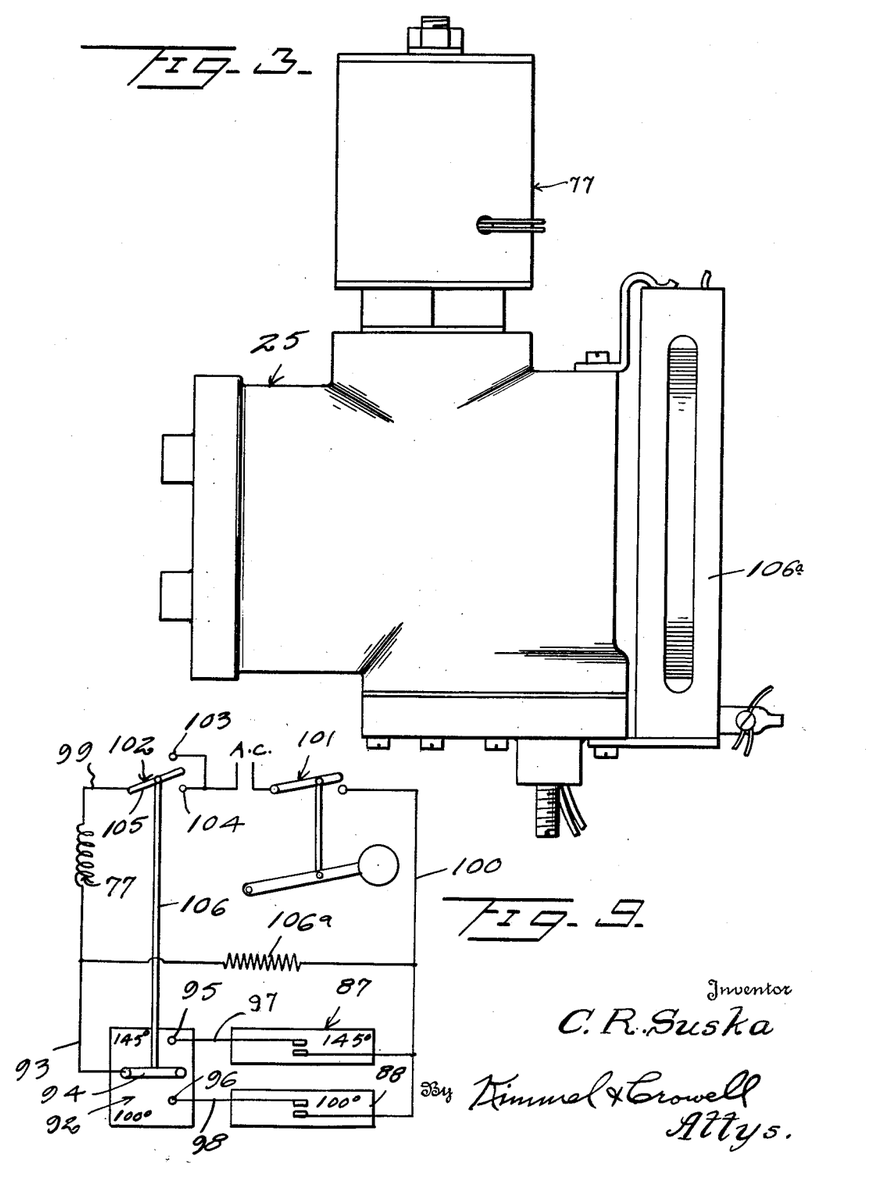
Figure 3 is a detail side elevation of the device.
Figure 9 is a diagrammatic view showing the electric circuits embodied in this invention.

Referring now to Figure 9, the solenoid 77 is connected at one end thereof to a time operated switch structure 92 by means of a conductor 93. The time or clock switch 92 is of conventional construction and includes a movable switch member or arm 94 actuated by the clock mechanism which is adapted to engage either contact 95 or contact 96. Contact 95 is connected to the thermostatic switch 87 by means of a conductor 97, and contact 96 is connected to thermostatic switch 88 by means of a conductor 98. The opposite end of the solenoid 77 is connected by means of a conductor 99 to one side of a supply source and the opposite sides of the thermostatic switches 87 and 88 are connected by means of a common conductor 100 to the oppostie side of the supply source.

A float operated switch 101 is interposed in the conductor 100, between the supply source and the thermostatic switches 87 and 88, and a clock operated switch 102 is interposed in the conductor 99 between the solenoid 77 and the supply source. The switch 102 includes a pair of contacts 103 and 104 and a movable switch arm 105 connected with the switch arm 94 by means of a connecting member 106. When the switch arm 94 is in circuit breaking position, the switch arm 105 is also in circuit breaking position. When the switch arm 94 is in engagement with contact 95, switch arm 105 engages contact 103. When switch arm 94 is in engagement with contact 96, switch arm 105 is in engagement with contact 104.

In order to provide for modulated operation of the solenoid 77, a resistor 106a is connected between conductors 93 and 100. In this manner when either of the thermostatic switches 87 and 88 are in circuit breaking position, a reduced current force is communicated with the solenoid 77 so that this solenoid will not immediately provide for complete closing of valve plug 51. The degree of current passing through the resistor 106a is such that valve plug 51 will be held in slightly open position until the time switch 92 is moved to circuit breaking position, thereby also breaking the circuit to the solenoid 77 through switch 102, or until float switch 101 is moved to circuit breaking position.

Where the time switch 92 is changing from a high to a low temperature, and the temperature of the fluid in the valve is above the temperature for which the low temperature switch 88 is set, switch 88 will remain open, but resistor 106a will function to hold the main valve against complete closing and permit cold fluid to pass through the valve until switch 88 closes. In this manner the flow of fluid through the valve will not be cut off until the end of the time period.

It will be understood that the float associated with the float switch 101 will be disposed within the washing machine for operation by the rise or fall of the level of water or other liquid within the washing machine.

Figures 7, 8, 13:
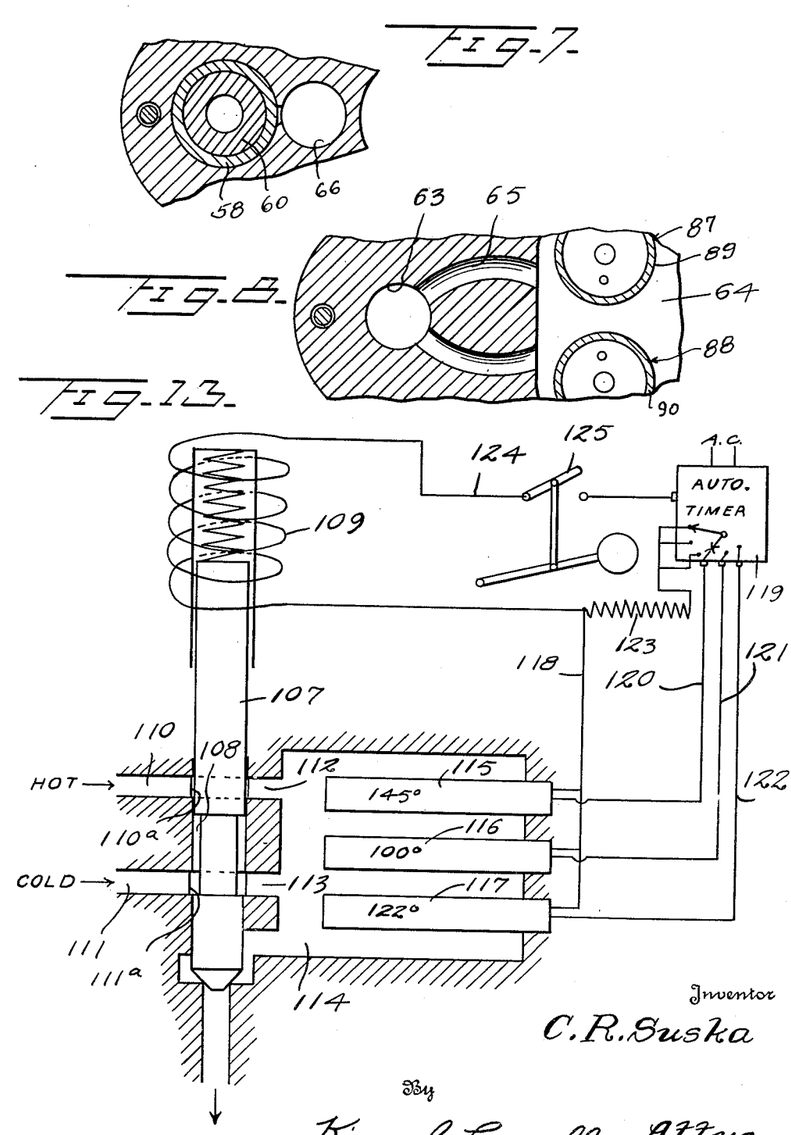
Figure 7 is a fragmentary sectional view taken on the line 7—7 of Figure 4.
Figure 8 is a fragmentary sectional view taken on the line 8—8 of Figure 4.
Figure 13 is a diagrammatic view of a modified form of this invention.
Figures 10, 11:
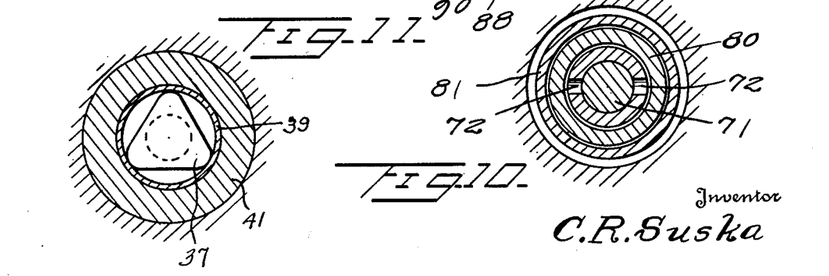
Figure 10 is a fragmentary sectional view taken on the line 10—10 of Figure 4.
Figure 11 is a fragmentary sectional view taken on the line 11—11 of Figure 4.

Referring now to Figure 13, there is disclosed a slightly modified form of this invention wherein the valve plug 107 is formed with a relatively long annular groove or channel 108, which upon upward movement of the plug 107 through energizing of the solenoid 109 will move to a position communicating the hot water intake port 110 and the cold water intake port 111 with outlet ports 112 and 113. Annular grooves 110a and 111a communicate with ports 110 and 111 respectively, to provide an even pressure entirely around plug 107. The ports 112 and 113 communicate with a relatively large mixing chamber 114 within which are disposed thermostatic switch members 115, 116 and 117. The switch members 115, 116 and 117 are connected to one end of the solenoid 109 by means of a common conductor 118, and the thermostatic switch members are connected to a timing switch member 119 by means of conductors 120, 121 and 122 respectively.

A resistor 123, similar to resistor 106a is connected across conductor 118 and time switch 119 for energizing solenoid 109 sufficiently to hold valve 107 against complete closing when any one of the thermostatic switches is open and timer 119 is still in circuit closing position. A float operated switch 125 is interposed in conductor 124 for cutting off current to the solenoid 109 when the receiver has been filled to a predetermined degree.

Figures 14, 15, 16:
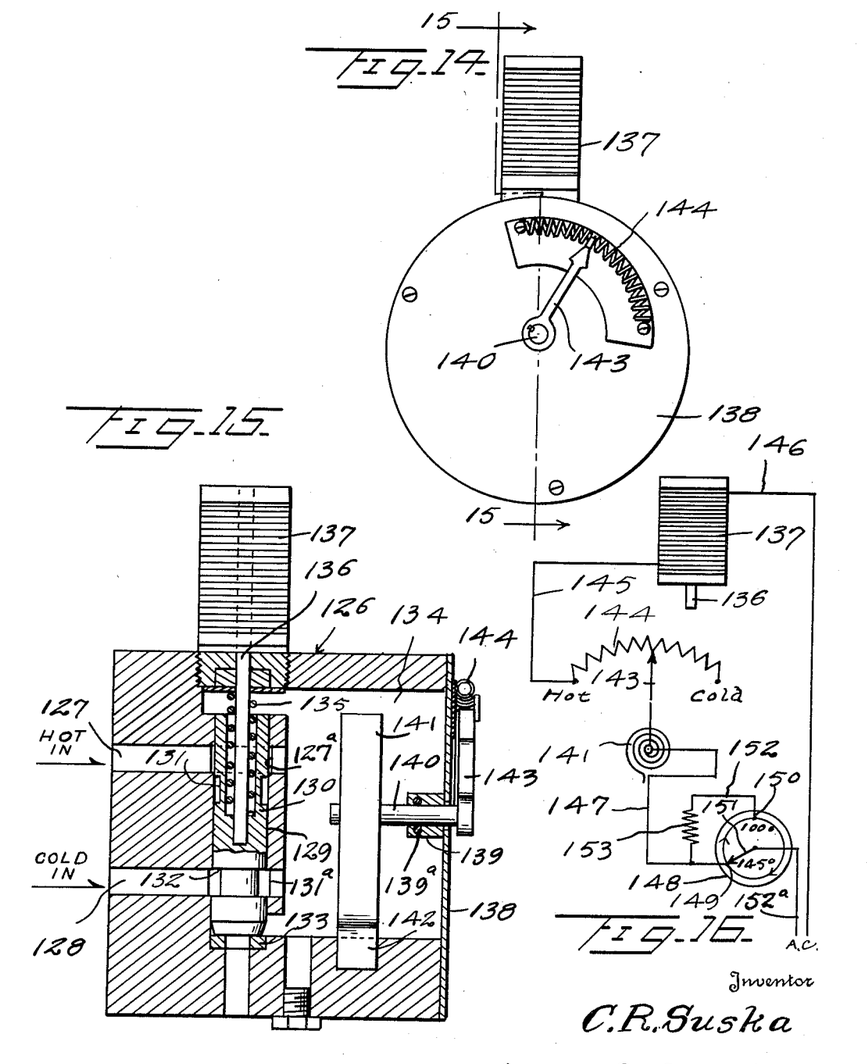
Figure 14 is a detail side elevation of another modification of this invention.
Figure 15 is a sectional view taken on the line 15—15 of Figure 14.
Figure 16 is a diagrammatic view showing the electric circuits embodied in the modification shown in Figures 14 and 15.

Referring now to Figures 14 to 16 inclusive, the numeral 126 designates generally a valve housing formed with fluid intake ports 127 and 128 for admission of hot and cold fluid respectively. The housing 126 includes a vertically disposed bore 129 within which a valve plug 130 is slidably mounted. The housing 126 is formed with annular grooves 127a and 131a communicating with ports 127 and 128 respectively, so as to equalize the intake pressure around plug 130. The bore 129 extends across the ports 127 and 128 and the plug 130 is provided with a pair of lengthwise spaced apart annular grooves 131 and 132, correlated with ports 127 and 128 so that upon upward movement of plug 130 ports 127 and 128 will be disposed in communication with grooves 131 and 132 respectively. When plug 130 is in closed position engaging a valve seat 133, groove or channel 132 will be in registry with port 128 so as to admit only cold water to a mixing chamber 134.

The valve plug 130 is constantly urged to closed position by means of a spring 135 and is adapted to be moved to selected open position by upward movement of a solenoid core 136 associated with a solenoid coil 137 mounted on the upper side of the housing 126. The chamber 134 has secured to the outer end thereof a plate or head 138 formed with a bushing 139 and seal 139a, through which a shaft 140 rotatably engages. The shaft 140 is connected to the inner convolution or end of a spiral thermostatic member 141 which has the opposite end 142 fixed to the housing 126. The shaft 140 has fixed to its outer end a wiper or rheostat arm 143 which is adapted to wipe over a resistance member 144 fixed to the plate or head 138 on the outside of the chamber 134.

One end of the resistor 144 is connected by means of a conductor 145 to one end of the solenoid coil 137, and the other end of the coil 137 is connected by conductor 146 to a source of electric current supply. The wiper 143 is connected by means of a conductor 147 to a time or clock switch 148, which includes a pair of contacts 149 and 150, engageable by a movable switch arm 151. Contact 150 is connected to conductor 147 by means of a conductor 152 and a resistor 153 is interposed between conductor 152 and conductor 147 so that a small amount of electric current will pass through conductor 147 when wiper 151 is in engagement with contact 150. The value of resistor 153 is calculated such that its value plus the value of the resistance of rheostat 143—144 between contact arm 143 and conductor 145 will provide the necessary small amount of current passing to solenoid 137 to thereby effect the required movement and positioning of valve plug 130 to obtain the selected or desired temperature of fluid passing through the valve.

A conductor 152a is connected between switch arm 151 and the opposite side of the electric current supply.

Referring now to Figures 17 to 22 inclusive, there is disclosed another modification of this invention which includes a valve housing 154 having a pair of intake nipples 155 and 156 for admitting hot and cold fluids respectively. The housing 154 is formed with ports 157 and 158 correlated with intake nipples 155 and 156 respectively, the ports 157 and 158 communicating at their inner ends with a mixing chamber 159.

Figures 22, 23:
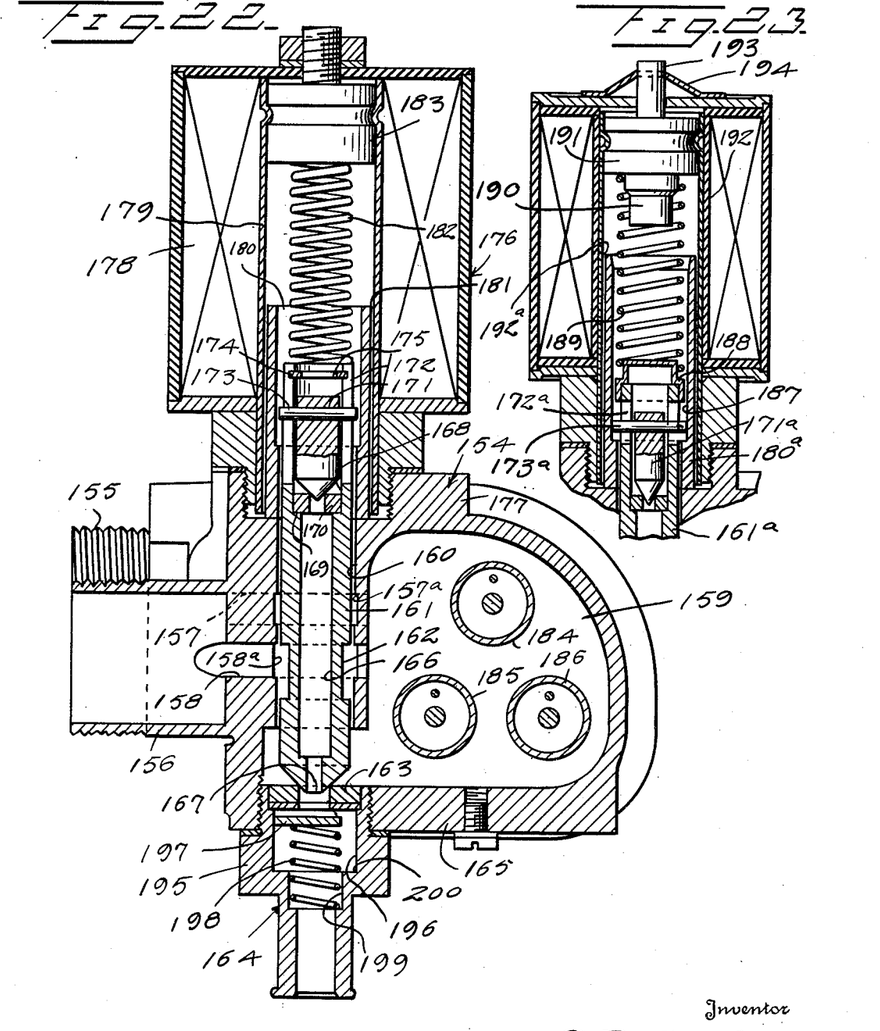
Figure 22 is a vertical section taken substantially on the line 22—22 of Figure 19.
Figure 23 is a fragmentary vertical section of another modification of this invention.

The housing 154 includes a vertically disposed valve plug guiding bore 160 which intersects the ports 157 and 158, and a plug 161 is loosely mounted within the guide bore 160. Housing 154 is formed with annular grooves 157a and 158a communicating with ports 157 and 158 so as to equalize intake pressure around plug 161. The plug 161 is formed with a single relatively long peripheral groove 162 which is adapted to be disposed in substantial registry with the cold fluid port 158 when the lower end of the plug 161 engages on a valve seat 163. An outlet nipple 164 is threaded into the bottom wall 165 of the housing 154 and is counterbored for receiving the valve seat 163 at its inner end.

The valve plug 161 is formed with a longitudinal bore 166 and also with a reduced diameter counterbore 167 at its lower end which is smaller in diameter than the opening through the seat 163. The upper portion of the valve plug 161 is formed with a second counterbore 168, forming a shoulder 169 on which a pilot valve seat 170 is adapted to engage. A valve 171 is slidable in the counterbore 168 and valve plug 161 is provided with diametrical lengthwise extending slots 172 within which a pin 173 extending through the pilot valve 171 loosely engages.

The plug 161, adjacent the upper end thereof, has mounted in an internal groove 174 a split locking ring 175 which limits the upward movement of the pilot valve 171. A solenoid member, generally designated as 176, is mounted on the upper wall 177 of the housing 154 and includes a coil 178, engaging about a tubular member 179 which forms a guide for the solenoid core 180. The core 180 is loosely disposed within guide 179, there being a space 181 between guide 179 and core 180 which forms a sufficiently high resistance flow path for the liquid in guide 179 so that movement of core 180 can occur when forces are applied to the core. A spring 182 which constitutes a balancing spring, and a plug moving spring is disposed on the upper end of the valve plug 161, and the spring 182 at its upper end bears against a plug 183 positioned within the tubular member 179.

When the plug 161 moves upwardly, spring 182 will be tensioned thereby, the degree of current in solenoid coil 178 and the tension of spring 182 determining the position of plug 161.

The mixing chamber 159 which also constitutes a regulating chamber has disposed therein three thermostatic switch members 184, 185 and 186 which are similar to the thermostatic switch members 87 and 88. The electric circuits between the thermostatic switches 184, 185 and 186 and the solenoid 176, together with the time switch and the float switch are identical with the electric circuits embodied in Figure 9.

Referring now to Figure 23, there is disclosed a slightly modified form of the structure shown in greater detail in Figure 22. The valve plug 161a has associated therewith a pilot valve 171a and the upper end portion of the plug 161a is formed with a pair of diametrically disposed slots 172a which in the present instance terminate short of the upper end of the plug 161a. The pilot valve 171a has extending therethrough a pin 173a which loosely engages in the slots 172a and extends into a counterbore 187 which is formed in the solenoid core 180a. The upper end of the plug 161a has mounted thereon a cap 188, about which the lower end of a spring 189 engages. The upper end of the spring 189 engages about a depending stud 190, carried by a plug 191, secured within the upper end portion of the guide tube 192 for the core 180a. The plug 191 has extending upwardly therefrom a stud 193 on which a nut or securing member 194 is mounted to hold the solenoid coil and housing against removal. In the present instance the spring 189 will constantly urge the plug 161 to closed position in view of the fact that the upper end of spring 189 bears against the lower side of plug 191. There is a space 192a between core 180a and guide 192 to provide a sufficiently high resistance flow path for the water so that movement can occur when forces are applied to the magnetic core.

Figures 17, 18, 24:
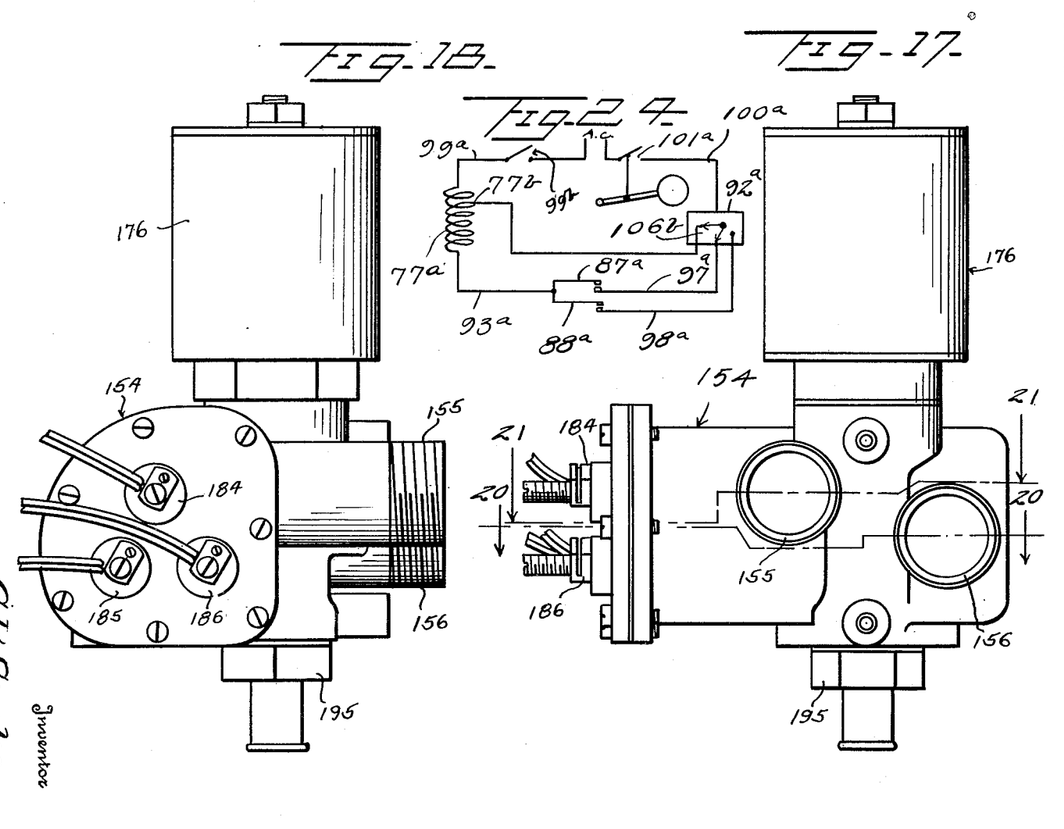
Figure 17 is a detail side elevation of another modification of this invention.
Figure 18 is a detail end elevation of the structure shown in Figure 17.
Figure 24 is a diagrammatic view of a modified form of electric circuit for use with the valves herein disclosed.
Figure 19:
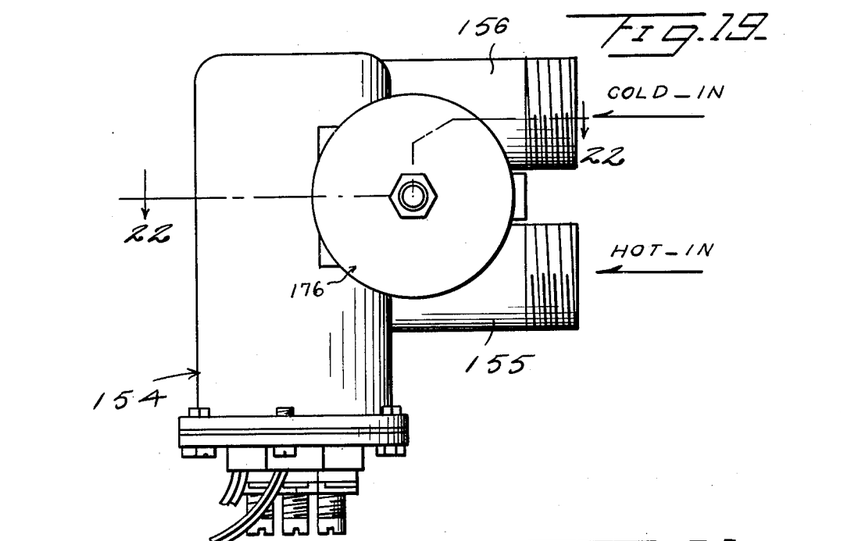
Figure 19 is a plan view of the structure shown in Figures 17 and 18.
Figures 20, 21:
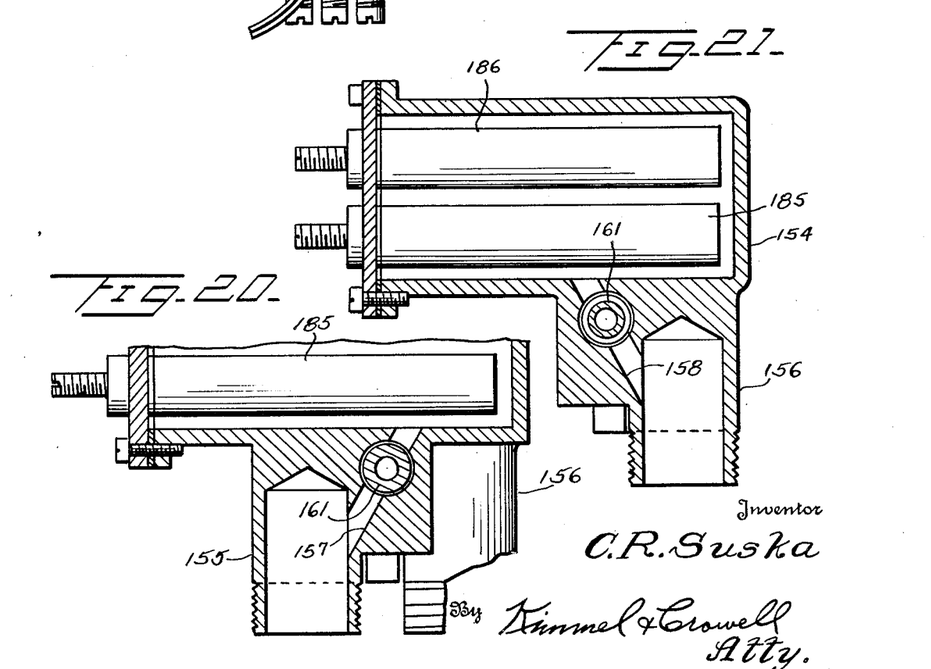
Figure 20 is a fragmentary sectional view taken on the line 20—20 of Figure 17.
Figure 21 is a sectional view taken on the line 21—21 of Figure 17.

In Figure 24 there is shown a modified electric circuit for use with any one of the valve structures herein disclosed. The solenoid coil 77a is connected at one end by conductor 99a to one side of a supply source, and the other end of coil 77a is connected by conductor 93a to thermostatic switches 87a and 88a. Switches 87a and 88a are connected by conductors 97a and 98a to timer 92a. In the present instance switch 106b forms a part of timer 92a and switch 106b is connected to a tap 77b in coil 77a at such a point along coil 77a that sufficient current will pass to coil 77a to keep the main and pilot valves against complete closing when a thermostatic switch is open and timer 92a is still in circuit closing position. The purpose for tapping into coil 77a and the results obtained thereby are the same as for resistor 106a shown in Figure 9. A float switch 101a is interposed in conductor 100a between timer 92a and the other side of the supply source, and a manual cut-off switch 99b is interposed in conductor 99a.

As shown in Figure 22, outlet nipple 164 is threaded into housing 154 and includes a boss 195 having a relatively large bore 196 in which a pressure reducing valve 197 of triangular configuration is loosely mounted. A spring 198 which is seated at its lower end in a counterbore 199 bears at its upper end against valve member 197. Under increased pressure through outlet port 167 valve 197 will move downwardly toward seat 200 and thereby restrict the flow of fluid through the bore of nipple 164 and also reduce the pressure of the discharged fluid. The pressure reducing structure shown in Figure 22 may be incorporated with the outlet of any one of the valves herein disclosed.

In the use and operation of this valve structure, the intake nipples 26 and 27 of the structure shown in Figures 1 to 12 inclusive will be connected to a source of hot and cold water respectively. Nipple 91 will be connected with a washing machine or other receiver of the tempered fluid. When it is desired to discharge fluid of a predetermined temperature into the receiver, the switch arm 94 is connected with either contact 95 or 96. Assuming that arm 94 is connected with contact 95, the temperature of the fluid passing through the valve structure for discharge into the receiver will be substantially 145°. When the receiver is empty, float switch 101 will be disposed in closed position and when arm 94 engages contact 95, arm 105 will engage contact 103.

Solenoid 77 will raise valve plug 51 so that groove 53 will communicate hot water port 44 with port 67 and at this time groove 54 may be in partial registry with ports 50 and 68. With fluid passing through ports 44 and 67 and ports 50 and 54, the check valves at the inner ends of chambers 28 and 46 will move to open position. When solenoid coil 78 is initially energized, core 80 will move upwardly and in the initial upward movement of core 80 there will be a lost motion between this core and the pilot and main valve plug members. After core 80 moves upwardly a predetermined distance, shoulder 82 of core 80 will strike pin 73 at the ends thereof, thereby causing a hammer blow on the plug 71 and after plug 71 has moved upwardly a predetermined distance, the upper end of plug 71 will strike locking ring 83 so that main valve plug 51 will be given a hammer blow to move this main valve plug to open or mixing position.

In operation, valve plug 51 will be oscillated up and down with the lower end of the valve plug in open position. The vertical position of valve plug 51 will be regulated by opening and closing of thermostatic switch 87. All of these thermostatic switches are of highly sensitive characteristic so that they will move to either open or closed position by slight variation of temperature in the fluid within which these switches are immersed.

The structure embodied in Figure 13 will operate in the same manner as the structure embodied in Figures 1 to 12 inclusive.

The structure embodied in Figures 14 to 16 will operate in the same manner as the structure embodied in Figures 1 to 12 inclusive, with the exception that the amount of electric current to the solenoid 137 is regulated by the position of the rheostat arm 143 which is swung across the resistance 144 by expansion or contraction of bi-metallic member 141. When relatively hot fluid is desired, switch arm 151 is moved to contact 149 of time switch member 148 and at this time, inasmuch as chamber 134 contains cold fluid, arm 143 will have been moved in a counter-clockwise direction.

With respect to the resistance member 144, when a lower temperature of fluid passes through the chamber 134, thermostatic member 141 will swing wiper or rheostat arm 143 counter-clockwise, as viewed in Figure 16. With a greater resistance between solenoid 137 and the supply source, solenoid core 136 will not rise as high as where hotter fluid is desired, and groove 131 will be disposed at least partially out of registry with port 127, whereas groove 132 will be disposed almost completely in registry with port 128.

Resistance 153 is calculated such that when switch arm 151 is adjusted, as an example to 100°, rheostat arm 143 will be effective to regulate the operation of solenoid 137 within one zone of resistance 144 such that valve plug 130 will be maintained by solenoid 137 and spring 135 in a position to dispose 100° liquid in chamber 134, and when arm 151 is engaged with contact 149 resistance 153 will be bypassed so that arm 143 will operate in another zone of resistance 144 and will provide for higher temperature of liquid in chamber 134.

The structure shown in Figures 17 to 23 will operate in substantially the same manner as for the structure shown in Figures 1 to 12 inclusive. It will be noted particularly that the valve plugs 51, 161 and 161a are of substantially smaller diameter than the guide bores for these plugs so that fluid pressure will be communicated to the upper ends of both the main and the pilot plugs and so that the fluids within the guide members for the solenoid cores may flow downward when the cores and the valve plugs are moved upward to open position. This slight space is, however, of substantially a size that fluid cannot flow from one port to the other in either the open or closed position of the valve plug.

The clearance spaces between the core members and the core guides tend to retard the quick movement of the core members to valve opening position, as the core members are retarded in their movement by the flow of liquid through these spaces. There is, therefore, provided a dashpot or cushioning action which will retard the oscillatory movement of the plugs, reduce the frequency of the repeated closing and breaking of the circuit to the solenoid by any one of the thermostatic switches, prolong the useful life of the switches, and provide a time period for heat transfer to the thermostatic switches.

It might be stated that with respect to Figures 4 and 22, the springs 84 and 182 will serve as a counter-balancing means against the magnetic force moving the solenoid cores 80 and 180 upwardly. When the current to the solenoid has been cut off by opening of a thermostatic switch, the springs 84 and 182 will expand rapidly so that the valve cores will by expansion of the springs be assisted in their gravity movement to closed position.

I do not mean to confine myself to the exact details of construction herein disclosed, but claim all variations falling within the purview of the appended claims.

What I claim is:

1. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with means normally registering with one of said intake ports and normally closing the other of said intake ports when said plug is engaged on said seat, an electric operator connected with said plug carried by said housing for moving said plug to open position, spring means for moving said plug to closed position and counter-balancing the magnetic force generated by said operator when said plug is moved to open position, and thermostatic switch means carried by said housing disposed in heat exchange relation with the fluid in said chamber connected with said operator whereby said operator will move the plug to open position in accordance with the temperature of fluid passing through said chamber.

2. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of grooves, one of said grooves normally registering with one of said intake ports and the other of said grooves being normally out of registry with the other of said intake ports when said plug is engaged on said seat, an electric operator for said plug carried by said housing for moving said plug to open position, spring means for moving said plug to closed position and counter-balancing the magnetic force generated by said operator when said plug is moved to open position, and thermostatic switch means carried by said housing in said mixing chamber, connected with said operator whereby said operator will move the plug to open position in accordance with the temperature of fluid passing through said chamber.

3. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of grooves, one of said grooves normally registering with one of said intake ports and the other of said grooves being normally out of registry with the other of said intake ports when said plug is engaged on said seat, an electric operator for said plug carried by said housing for moving said plug to open position, spring means for moving said plug to closed position and counter-balancing the magnetic force generated by said operator when said plug is moved to open position, a regulating chamber in said housing between said seat and said outlet port, and thermostatic switch means carried by said housing in said regulating chamber connected with said operator whereby said operator will move said plug to said open position in accordance with the temperature of fluid passing through said regulating chamber.

4. In combination a tempered mixing means comprising a fluid mixing valve spring pressed to closed position, an electric operator for moving said valve to open position, thermostatic switch means connected with said operator whereby said operator will move said valve to open position in accordance with the temperature of the fluids passing through said valve, a time switch connected with said thermostatic means, and resistance means connected between one side of the electric supply source and said operator whereby to effect reduced movement of said operator when said thermostatic switch means is in circuit breaking position to thereby produce a mixture of reduced temperature.

5. In combination a tempered mixing means comprising a fluid mixing valve spring pressed to closed position, an electric operator for moving said valve to open position, thermostatic switch means connected with said operator whereby said operator will move said valve to open position in accordance with the temperature of the fluids passing through said valve, a time switch connected with said thermostatic means, a resistor connected between one side of the electric supply source and said operator whereby to effect reduced movement of said operator when said thermostatic switch means is in circuit breaking position, a switch interposed between the opposite side of said operator and the opposite side of the supply source, and an operative connection between said latter switch and said time switch.

6. In combination a tempered mixing means comprising a fluid mixing valve spring pressed to closed position, an electric operator for moving said valve to open position, thermostatic switch means connected with said operator whereby said operator will move said valve to open position in accordance with the temperature of the fluids passing through said valve, a time switch connected with said thermostatic means, resistor means connected between one side of the electric supply source and said operator whereby to effect reduced movement of said operator when said thermostatic switch means is in circuit breaking position to thereby produce a mixture of reduced temperature, a switch interposed between the opposite side of said operator and the opposite side of the supply source, an operative connection between said latter switch and said time switch, and a float switch interposed in said one side of said supply source.

7. A temperature controlled mixing valve comprising a housing having a pair of fluid intake ports, a mixing chamber in said housing communicating with said intake ports, a valve plug intersecting said intake ports, a regulating chamber carried by said housing, said housing having a passage communicating said mixing and regulating chambers, a valve seat in said passage engageable by said valve plug, an electric operator connected with said plug, spring means between said plug and a fixed portion of said operator adapted to be tensioned by movement of said plug to open position and for normally urging said plug to closed position, and thermostatic switch means in said regulating chamber connected with said operator whereby said operator will move said plug to open position in accordance with the temperature of fluid in said regulating chamber, said regulating chamber having an outlet port for discharge of fluid therefrom.

8. A temperature controlled mixing valve comprising a housing having a pair of fluid intake ports, a mixing chamber in said housing communicating with said intake ports, a valve plug intersecting said intake ports, a regulating chamber carried by said housing, said housing having a passage communicating said mixing and regulating chambers, a valve seat in said passage engageable by said valve plug, an electric operator connected with said plug, a lost motion connection between said operator and said plug, spring means between said plug and a fixed portion of said operator adapted to be tensioned by movement of said plug to open position and for normally urging said plug to closed position, and thermostatic switch means in said regulating chamber connected with said operator whereby said operator will move said plug to open position in accordance with the temperature of fluid in said regulating chamber, said regulating chamber having an outlet port for discharge of fluid therefrom.

9. A temperature controlled mixing valve comprising a housing having a pair of fluid intake ports, a combined mixing and regulating chamber in said housing communicating with said ports, a valve plug slidably carried by said housing and intersecting said ports and formed with a pair of annular grooves for selective registry with said ports, a valve seat carried by said housing engageable by said plug when the latter is in closed position, said housing having an outlet port extending from said seat and communicating with said chamber, an electric operator connected with said plug adapted upon energization thereof to move said plug to open position, a spring constantly urging said plug toward said seat, a spiral thermostatic member in said chamber, a shaft connected with and rotatable by said thermostatic member, and a rheostat carried by said housing connected at one side thereof to said operator, said rheostat including a resistance fixed to said housing, and a wiper arm fixed to said shaft and having wiping engagement with said resistance.

10. A temperature controlled mixing valve comprising a housing having a pair of fluid intake ports, a combined mixing and regulating chamber in said housing communicating with said ports, a valve plug slidably carried by said housing and intersecting said ports and formed with a pair of annular grooves for selective registry with said ports, an outlet nipple carried by said housing communicating with said chamber, a valve seat for said plug carried by the inner end of said nipple, a spring constantly urging said plug toward said seat, an electric operator for said plug carried by said housing adapted upon energization thereof to move said plug off said seat and simultaneously dispose both of said grooves in communication with said ports, a lost motion connection between said operator and said plug, a plurality of thermostatic switch members in said chamber connected with said operator.

11. A temperature controlled mixing valve comprising a housing having a pair of fluid intake ports, a combined mixing and regulating chamber in said housing communicating with said ports, a valve plug slidably carried by said housing and intersecting said ports and formed with a pair of annular grooves for selective registry with said ports, an outlet nipple carried by said housing communicating with said chamber, a valve seat for said plug carried by the inner end of said nipple, a spring constantly urging said plug toward said seat, an electric operator for said plug carried by said housing adapted upon energization thereof to move said plug off said seat and simultaneously dispose both of said grooves with said ports, a lost motion connection between said operator and said plug, a plurality of thermostatic switch members in said chamber connected with said operator, a pilot valve carried by said plug, and means carried by said pilot valve whereby the latter will be moved to open position by said operator before said plug is moved to open position.

12. A temperature controlled mixing valve comprising a housing having a pair of fluid intake ports, a combined mixing and regulating chamber in said housing communicating with said ports, a valve plug slidably carried by said housing and intersecting said ports and having a pair of annular grooves adapted for selective communication with said ports, said housing having an outlet port communicating with said chamber, an electric operator connected with said plug adapted upon energization thereof to move said plug off said seat and simultaneously dispose both of said grooves in communication with said ports, a thermostatic member correlated with said chamber, and a variable resistance unit connected with said operator and correlated with said thermostatic member and operable thereby whereby to vary the effectiveness of said operator.

13. In combination a tempered mixing means comprising a fluid mixing valve spring pressed to a closed position, an electric operator connected with said valve for moving said valve to open position, thermostatic switch means connected with said operator and in heat exchange relation with the fluid passing through said valve whereby said operator will move said valve to open position in accordance with the temperature of the fluids passing through said valve, a time switch connected with said thermostatic means, a resistor connected between one side of the electric supply source and said operator whereby to effect reduced movement of said operator when said thermostatic switch means is in circuit breaking position to thereby produce a mixture of reduced temperature, and a switch interposed between the opposite side of said operator and the opposite side of the supply source.

14. In combination a tempered mixing means comprising a fluid mixing valve spring-pressed to closed position, an electric operator connected with said valve for moving said valve to open position, thermostatic switch means connected with said operator and in heat exchange relation with the fluid passing through said valve whereby said operator will move said valve to open position in accordance with the temperature of the fluids passing through said valve, a time switch connected with said thermostatic means, means connected between one side of the electric supply source and said operator whereby to effect reduced movement of said operator when said thermostatic switch means is in circuit breaking position to thereby produce a mixture of reduced temperature, a switch interposed between the opposite side of said operator and the opposite side of the supply source, and a float switch interposed in said one side of said supply source.

15. A temperature controlled mixing valve comprising a housing formed with at least two fluid intake ports, a mixing chamber communicating with said ports, said housing also having an outlet port communicating with said chamber, a valve seat between said outlet port and said chamber, a spring-pressed valve plug slidably carried by said housing intersecting said intake ports and formed with an annular groove normally registering with one of said intake ports and a second annular groove normally out of registry with the other of said intake ports when said plug is engaged on said seat, an electric operator for said plug carried by said housing for moving said plug to open position, and thermostatic switch means carried by said housing connected with said operator and in heat exchange relation with the fluid in said chamber whereby said operator will move said plug to open position in accordance with the temperature of fluid passing through said chamber.

16. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of annular grooves, one of said grooves normally registering with one of said intake ports and the other of said grooves being normally out of registry with the other of said intake ports when said plug is engaged on said seat, an electric operator for said plug carried by said housing for moving said plug to open position, and thermostatic switch means carried by said housing in said mixing chamber connected with said operator whereby said operator will move said plug to open position in accordance with the temperature of fluid passing through said chamber.

17. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of annular grooves, one of said grooves normally registering with one of said intake ports and the other of said grooves being normally out of registry with and normally closing the other of said intake ports when said plug is engaged on said seat, an electric operator for said plug carried by said housing for moving said plug to open position, a regulating chamber in said housing between said seat and said outlet port, and thermostatic switch means carried by said housing in said regulating chamber connected with said operator whereby said operator will move said plug to open position in accordance with the temperature of fluid passing through said regulating chamber.

18. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of annular grooves, one of said grooves normally registering with one of said intake ports and the other of said grooves being normally out of registry with the other of said intake ports when said plug is engaged on said seat, an electric operator for said plug carried by said housing for moving said plug to open position, spring means for moving said plug to closed position and counter-balancing the magnetic force generated by said operator when said plug is moved to open position, and thermostatic switch means connected with said operator whereby said operator will move said plug to open position in accordance with the temperature of fluid discharged from said housing.

19. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of annular grooves, one of said grooves normally registering with one of said intake ports and the other of said grooves being normally out of registry with the other of said intake ports when said plug is engaged on said seat, an electric operator for said plug carried by said housing for moving said plug to open position, and thermostatic switch means connected with said operator and disposed in heat exchange relation with respect to said chamber whereby said operator will move said plug to open position in accordance with the temperature of fluid discharged from said housing.

20. A temperature controlled mixing valve comprising a housing formed with at least two fluid intake ports, a mixing chamber communicating with said ports, said housing also having an outlet port communicating with said chamber, a valve seat between said outlet port and said chamber, a valve plug slidably carried by said housing intersecting said intake ports and formed with a pair of annular grooves, one of said grooves normally registering with one of said intake ports and the other of said grooves being normally out of registry with the other of said intake ports when said plug is engaged on said seat, an electric operator for said plug carried by said housing for moving said plug to open position, spring means for moving said plug to closed position and counter-balancing the magnetic force generated by said operator when said plug is moved to open position, a regulating chamber in said housing between said seat and said outlet port, and thermostatic switch means connected with said operator and disposed in heat exchange relation with respect to said chamber whereby said operator will move said plug to open position in accordance with the temperature of fluid discharged from said housing.

21. In combination a tempered mixing means comprising a fluid mixing valve having a pair of intake ports and an outlet port, a valve plug correlated with said intake ports, an electric operator for said plug, thermostatic current regulating means connected with said operator whereby said operator will move said plug to open position in accordance with the temperature of the fluids passing through said valve, a time switch connected with said thermostatic means, and resistance means connected between one side of the electric supply source and said operator whereby to effect reduced movement of said operator when said thermostatic current regulating means is in circuit breaking position to thereby produce a mixture of reduced temperature.

22. In combination a tempered mixing means comprising a fluid mixing valve having a pair of intake ports and an outlet port, a valve plug correlated with said intake ports, an electric operator for said plug, thermostatic switch means connected with said operator whereby said operator will move said plug to open position in accordance with the temperature of the fluids passing through said valve, and resistance means connected between one side of the electric supply source and said operator whereby to effect reduced movement of said operator when said thermostatic switch means is in circuit breaking position to thereby produce a mixture of reduced temperature.

23. A temperature controlled mixing valve comprising a housing having a pair of fluid intake ports, a combined mixing and regulating chamber in said housing communicating with said ports, a valve plug slidably carried by said housing and intersecting said ports, said plug having a pair of annular grooves so positioned that one of said grooves will normally be in registry with one of said intake ports, and the other of said grooves will be normally out of registry with the other of said intake ports, a valve seat carried by said housing engageable by said plug, said housing having an outlet port extending from said seat and communicating with said chamber, an electric operator connected with said plug, and a thermal responsive current regulator in said chamber connected with said operator whereby said operator will move said plug to open position according to the temperature of fluid in said chamber.

24. A temperature controlled mixing valve comprising a housing having a pair of fluid intake ports, a combined mixing and regulating chamber in said housing communicating with said ports, a valve plug slidably carried by said housing and intersecting said ports, said plug having a pair of annular grooves so positioned that one of said grooves will normally be in registry with one of said intake ports, and the other of said grooves will be normally out of registry with the other of said intake ports, an outlet nipple carried by said housing communicating with said chamber, a valve seat for said plug carried by the inner end of said nipple, an electric operator for said plug carried by said housing, a lost motion connection between said operator and said plug, said operator including means for retarding the movement of said plug to open and mixing position to thereby produce a mixture of reduced temperature, and a plurality of thermostatic switch members in said chamber connected with said operator.

CHARLES R. SUSKA.

REFERENCES CITED

The following references are of record in the file of this patent:

UNITED STATES PATENTS

| Number | Name | Date |
| --- | --- | --- |
| 1,103,756 | Gebhardt | July 14, 1914 |
| 1,925,686 | Chism | Sept. 5, 1933 |
| 2,082,121 | Rypinski | June 1, 1937 |
| 2,140,553 | Rypinski | Dec. 20, 1938 |
| 2,146,930 | Bassett | Feb. 14, 1939 |
| 2,244,808 | Scott et al. | June 10, 1941 |
| 2,296,266 | Breckenridge | Sept. 22, 1942 |